Oct. 3, 1950

B. W. NORDLANDER ET AL 2,524,536

INSULATED ELECTRICAL CONDUCTOR

Filed June 13, 1945

Inventors:
Birger W. Nordlander,
John A. Loritsch,
by [signature]
Their Attorney.

Patented Oct. 3, 1950

2,524,536

UNITED STATES PATENT OFFICE 2,524,536

INSULATED ELECTRICAL CONDUCTOR

Birger W. Nordlander, Schenectady, and John A. Loritsch, Scotia, N. Y., assignors to General Electric Company, a corporation of New York Application June 13, 1945, Serial No. 599,164

8 Claims. (Cl. 174—121)

Figure 1:
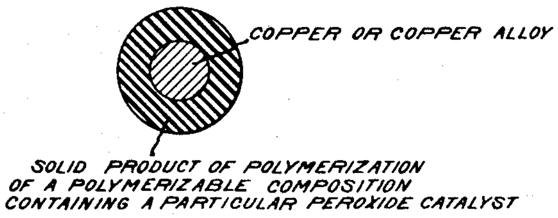

This invention relates to the production of electrical coils and other articles comprising metallic copper or a copper alloy. More particularly the invention is concerned with the production of articles having, in combination, (1) a metal of the class consisting of copper and its alloys and (2) a polymeric material, e. g., a polymerized composition comprising a polymerized unsaturated alkyd resin. Specifically, the articles of our invention are produced by a method which involves polymerizing, in contact with a metal of the aforementioned class, a polymerizable composition which, when benzoyl peroxide or its equivalent is incorporated therein, attacks the aforesaid metal due to the said peroxide contained therein, causing retardation or inhibition of polymerization, said composition having incorporated therein as an accelerator of polymerization a compound of the class consisting of secondary-butyl hydroperoxide, tertiary-butyl hydroperoxide, tertiary-amyl hydroperoxide, 1-hydroxycyclohexyl hydroperoxide-1, 1,1'-di-(hydroxycyclohexyl) peroxide-1,1', di-(tertiary-butyl perphthalate), di-(tertiary-butyl persuccinate), di-(tertiary-butyl peradipate), tertiary-butyl perfuroate, di-(methyl maleoyl) peroxide and low-molecular-weight polymers (e. g., dimers, trimers, tetramers, pentamers, hexamers, etc.) of di-(methyl maleoyl) peroxide. Polymerization preferably is effected under heat, e. g., at a temperature within the range of 60° to 130° C.

The formulas for the aforementioned monomeric compounds are shown below:

I

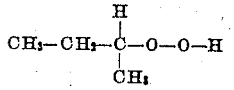

Secondary-butyl hydroperoxide

II

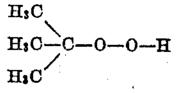

Tertiary-butyl hydroperoxide

III

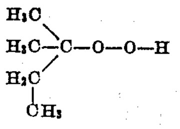

Tertiary-amyl hydroperoxide

IV

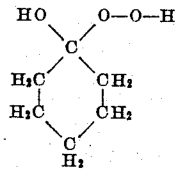

1-hydroxycyclohexyl hydroperoxide-1

V

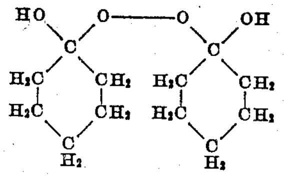

1,1'-di-(hydroxycyclohexyl) peroxide-1,1'

VI

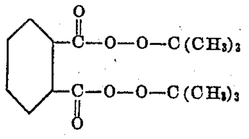

Di-(tertiary-butyl perphthalate)

VII

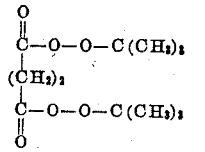

Di-(tertiary-butyl persuccinate)

VIII

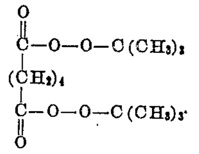

Di-(tertiary-butyl peradipate)

IX

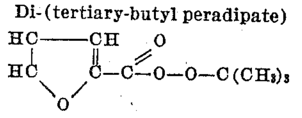

Tertiary-butyl perfuroate

X

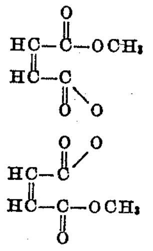

Di-(methyl maleoyl) peroxide

Secondary-butyl hydroperoxide, tertiary-butyl hydroperoxide, tertiary-amyl hydroperoxide, 1-hydroxycyclohexyl hydroperoxide-1 and di-(tertiary-butyl perphthalate) are available on the open market. Di-(tertiary-butyl persuccinate), di-(tertiary-butyl peradipate) and tertiary-butyl perfuroate are prepared, for example, by effecting reaction between the corresponding acid chloride and an alkaline-earth metal salt, e. g., the barium salt, of tertiary-butyl hydroperoxide. 1,1'-di-(hydroxycyclohexyl) peroxide-1,1' is produced by effecting reaction, in anhydrous tertiary-butyl alcohol, between cyclohexanone and hydrogen peroxide in the ratio of two mols of the former to one mol of the latter. After standing for several days at room temperature or thereabouts the anhydrous alcohol and other volatile matter are removed under reduced pressure, yielding an oily material having an active oxygen content corresponding to that calculated for 1,1'-di-(hydroxycyclohexyl) peroxide-1,1'. The particular grade of di-(methyl maleoyl) peroxide used in our tests was obtained from Buffalo Electro-Chemical Company, Inc., Buffalo, N. Y., as "Organic Peroxide No. 1453." It probably contained both monomeric di-(methyl maleoyl) peroxide and low-molecular-weight polymers thereof, examples of which have been given.

A specific embodiment of our invention is an electrical device including an electrical coil comprising windings of a copper conductor, solid permeable insulation adjacent said conductor, said insulation being impregnated with an impregnant which is in contact with at least a portion of said conductor and which comprises the product of polymerization, more particularly the solid product of polymerization, of the polymerizable, hardenable composition defined in the first paragraph of this specification.

Figure 2:
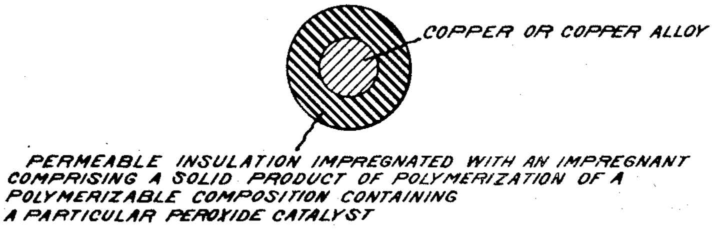

In the accompanying drawing Fig. 1 represents a cross-sectional view of a member composed of copper or copper alloy surrounded by, and in contact with, a solid product of polymerization of a polymerizable composition of the kind hereinbefore described with reference to our invention. Fig. 2 shows in cross-section a member composed of copper or copper alloy and permeable insulation, e. g., asbestos, glass fibers, cotton, etc., in thread, felted, woven or other form, upon said member, said insulation being impregnated with an impregnant which is in contact with at least a portion of said member and which comprises a solid product of polymerization of a polymerizable composition of the kind with which our invention is concerned.

Electrical devices including electrical coils in which combinations such as shown, for instance, in Fig. 2 advantageously are used, are illustrated in the drawings accompanying Nordlander, Loritsch and Bachli copending application Serial No. 509,366, filed November 8, 1943, assigned to the same assignee as the present invention and now abandoned.

It is known that copper salts exert a pronounced effect on the polymerization of unsaturated compounds and that, depending upon their concentration, they may retard or completely inhibit the polymerization which otherwise readily would take place. Sometimes advantage is taken of this property, for example in the stabilization of certain unstable materials during storage, distillation, etc. On the other hand, this effect may prove extremely troublesome when it becomes necessary to carry out polymerization in the presence of copper, such as when polymerization is effected in forming the insulation of electrical equipment where this metal is commonly present.

The polymerization of polymerizable compositions in contact with copper heretofore has been a considerable problem, especially in utilizing polymerizable materials of the class sometimes referred to as "solventless varnishes" in structures containing copper or alloys thereof, either bare or covered with untreated, permeable materials, e. g., yarns and fabrics such as those formed of cotton, glass, asbestos, silk, nylon, cellulose acetate and other cellulose esters, ethyl cellulose and other cellulose ethers, etc. "Solventless varnishes" include polymerizable systems of a relatively low vapor pressure, for example polymerizable unsaturated alkyd resins comprising polymerizable esters of a polyhydric alcohol (or a plurality of polyhydric alcohols) and an alpha-unsaturated alpha,beta-polycarboxylic acid (or a plurality of polycarboxylic acids, at least one of which is an alpha-unsaturated alpha,beta-polycarboxylic acid); polymerizable esters of an unsaturated monohydric alcohol, e. g., allyl alcohol, and an organic polybasic acid, e. g., a saturated or unsaturated aliphatic polycarboxylic acid, an aromatic polycarboxylic acid, a chlorinated or other halogenated aromatic polycarboxylic acid, an inorganic polybasic acid, e. g., phosphoric acid, etc.; polymerizable mixed esters of unsaturated monohydric alcohols and polybasic acids; polymerizable mixed esters of a polybasic acid and a plurality of alcohols, one of which is an unsaturated monohydric alcohol and another of which is a polyhydric alcohol; and mixtures of the aforementioned polymerizable esters. In the utilization of such polymerizable materials a small amount (e. g., 0.5 to 5% by weight) of a compound acting as an effective polymerization catalyst, usually benzoyl peroxide, is added to the polymerizable composition, and the mixture is heated at, for instance, 60–100° C. or thereabouts. Ordinarily, in due course of time, there is obtained a clear, water-white or light-colored product having high heat, moisture, acid and alkali resistance, outstanding mechanical and dielectric properties, and which contains little or none of the low-molecular-weight starting component or components.

When polymerizable compositions such as aforementioned are polymerized with the aid of benzoyl peroxide or equivalent material in the absence of copper or copper alloy, no difficulties ordinarily are encountered. However, when attempts are made to carry out the polymerization in the presence of metallic copper, or one of its alloys, the result is entirely different. An intense greenish-blue coloration soon develops around the copper surface, which coloration in extreme cases, at high ratio of copper surface to volume of varnish in normally-slow-polymerizing systems, may spread throughout the entire mass. Furthermore, instead of polymerization of the varnish into a hard solid having the aforementioned desirable properties being effected, a soft, jelly-like, crumbly material is formed around the copper where the coloration has appeared. Under the conditions which cause a green coloration to form throughout the mass, a complete inhibition of polymerization may occur. Since a large aggregate surface of copper is exposed to a relatively small amount of varnish in most electrical equipment where the conductors are to be provided with adequate insulation by an appropriate varnish treatment, for example in electrical coils, complete failure often is experienced when attempts are made to use varnishes of the above-described type in such applications. The varnish either will not polymerize at all or will convert only partially into a polymeric material, the mechanical and dielectric properties of which are unsatisfactory. The results of Examples 1, 2 and 3 more fully bring out these facts.

*Example 1*

A bundle of copper wire, consisting of 40 strands of wire of 80 mils diameter with an aggregate surface of about 160 square centimeters, was placed in a tightly fitting Pyrex test tube holding 10 grams of a varnish composed of, by weight, two parts of diallyl phthalate, one part of diethylene glycol maleate having an acid number of 60, and benzoyl peroxide in an amount corresponding to 0.5% by weight of the aforementioned components.

The bundle was completely immersed in the varnish, being separated from the bottom of the tube as well as covered on top with a one-centimeter layer of varnish. The tube was kept for 24 hours at 80° C. During this period excessive greening developed adjacent to the surface of the wires, and in these areas the varnish was converted into a very soft, cheesy gel having no mechanical strength. Further heating for 145 hours at 80° C. did not cause any improvement in the character of this material. It was noted that while the layer of varnish over the top of the bundle of wires did not discolor during the heating, nevertheless it was converted into a rather inferior, crumbly mass. In marked contrast, a sample of the same composition kept for 24 hours at 80° C. in the absence of the copper wires yielded a polymeric material that was very hard, rigid and tough throughout.

Numerous other tests in which the ratio of components, the concentration of benzoyl peroxide catalyst and the temperature were varied likewise gave similar unsatisfactory results when attempts were made to effect polymerization in the presence of copper. For a given slowly-polymerizing varnish the effect was more pronounced the higher the temperature. However, if the varnish was made to polymerize fairly rapidly, the greening and the inhibitation effect were less noticeable. Thus, at a given temperature, the higher the concentration of benzoyl peroxide (above a certain limiting value) the less visible was the attack on the cooper. This is understandable, since the shorter the time the polymerizable material remains liquid, the less is the attack on the copper and, consequently, the lower the concentration of copper salts in solution. As is shown by the results of Example 3, the retarding effect increases rapidly with an increase in the concentration of the copper in solution, complete inhibition of polymerization being effected by the presence of a very minute amount of copper. However, the control of the polymerization reaction, which is strongly exothermic, becomes more difficult the higher the catalyst concentration. When large thicknesses of material are to be formed by polymerization, it is essential that a slow polymerization rate be maintained. Otherwise the heat of polymerization may accumulate in the interior, causing variations in the rate of polymerization and hence unequal shrinkage throughout the mass with resulting formation of internal stresses in the product, which stresses eventually may be released by cracking of the mass thereby producing a material having little or no commercial value. For these reasons we found it to be entirely impractical to reduce the copper poisoning effect sufficiently by merely speeding up the rate of polymerization, e. g., by using a larger amount of benzoyl peroxide catalyst. Attempts in this direction invariably led to products that either were cracked or were too strained to have any immediate or durable value. It also was found that while little or no greening might be noticeable upon close examination, the polymerized material next to the copper nevertheless was rather soft, causing the wires to be very poorly bonded together. Good bonding is important, of course, in order to prevent movement of conductors and consequent abrasion of insulation resulting from magnetic and mechanical vibration. Another disadvantage resulting from not being able to obtain, in a practical way, completely polymerized products lies in the much higher dielectric loss factor, especially at high temperatures, which the incompletely polymerized products exhibit as compared with the corresponding, thoroughly polymerized materials.

The complete inhibition by copper of the polymerization of diallyl phthalate of negligible acid value, catalyzed by benzoyl peroxide, showed that the acidity of the polymerizable composition had little or no bearing on this phenomenon, as is evidenced by the results of Example 2.

*Example 2*

One single strand of an 80-mil-diameter copper wire was placed in a Pyrex test tube with 10 grams of diallyl phthalate (acid value less than one) containing 1% by weight of benzoyl peroxide. The sample was heated for 90 hours at 80° C. The liquid soon assumed an intensely green color and still remained fluid at the end of the heating period. On the other hand, a similar sample of diallyl phthalate kept at 80° C. in the absence of copper wire gelled in about 8 hours and was almost completely polymerized at the end of 50 hours, forming a very hard, tough, clear product containing, by weight, only 5% of acetone-extractable matter.

As shown by the results of Example 3, even very small traces of copper salts have a pronounced effect on the polymerization of polymerizable compounds of the kind aforementioned.

*Example 3*

The copper salt used was in the form of a blue solution obtained by heating diallyl phthalate containing benzoyl peroxide in the presence of freshly reduced copper turnings. Before use this solution, after having been decanted from the turnings, was heated to 170° C. to destroy the excess of benzoyl peroxide present. The copper content was then carefully determined and found to be 0.0004 gm. Cu per gm. of solution (or, by weight, 400 parts Cu per million parts of solution). Using this material, solutions of diallyl phthalate with 2% (by weight) added benzoyl peroxide and varying copper content were made up. These solutions were heated at 80° C. for 15 hours. The results are shown below:

| Sample No. | Copper Content in Parts per Million | Nature of Product |
|---|---|---|
| 1 | 0 | Hard, tough. |
| 2 | 1 | Do. |
| 3 | 5 | Rubbery, short. |
| 4 | 10 | Very soft gel. |
| 5 | 50 | Semi-fluid gel. |
| 6 | 100 | Very viscous syrup. |
| 7 | 200 | Viscous syrup. |
| 8 | 400 | Fluid syrup. |

As will be noted from the foregoing results, the presence of only 5 millionth of a gram of copper per gram of solution is very pronounced, the product being entirely different from the one which normally results. It also may be mentioned that Sample No. 8 did not gel even after heating for an additional 144 hours at 80° C.

The specific nature of the peroxides of the class with which this invention is concerned as effective agents for accelerating the polymerization of polymerizable compositions in the presence of copper or an alloy thereof is shown by the results of tests in which the following peroxides were used:

Acetyl peroxide
Caprylyl peroxide
Pelargonyl peroxide
Lauroyl peroxide
Stearoyl peroxide
3,4-dichlorobenzoyl peroxide
Diheptanol peroxide
Di-[phenyl-(hydroxy)-methyl] peroxide
Urea hydrogen peroxide
Dibenzal diperoxide
Di-(tetiary-butyl) peroxide
Tertiary-butyl perbenzoate Each peroxide was incorporated to the extent of 1% by weight in 10 grams of a varnish composed of equal parts by weight of diallyl phthalate and diethylene glycol maleate. A coil of bare copper wire, having an exposed surface of about 80 square centimeters, was immersed in the varnish. Two samples of each combination were heated for 48 hours, one at 60° C. and the other at 100° C. Although the attack on the copper and the retardation or inhibition of the polymerization of the varnish were more pronounced in some cases than in others, the results in all cases were such as to make it impractical to use any of the peroxides tested as polymerization catalysts in the presence of bare copper.

*Example 4*

Example 1 was repeated, only with the difference that 1% by weight of a 60% solution of tertiary-butyl hydroperoxide in tertiary-butyl alcohol was used as a catalyst instead of benzoyl peroxide; also, because of the low activity of tertiary-butyl hydroperoxide at lower temperatures, the sample was heated at 110° C. instead of at 80° C. as in Example 1. Gelation occurred within 2 hours. After heating for 24 hours the sample was found upon examination to have converted throughout into a solid, tough material that showed no trace whatsoever of discoloration or of attack upon the copper. When cut open the polymerized material proved to adhere very tenaciously to the copper. No difference could be noted in the quality of the polymerized material when compared with a sample of the same varnish polymerized for the same length of time at the same temperature in the absence of copper.

*Example 5*

A bundle of copper wire 80 mils in diameter having a total area of about 40 square centimeters and weighing about 10 grams, was immersed as described under Example 1 in 10 grams of a varnish composed of, by weight, two parts of diallyl phthalate, one part of diethylene glycol maleate having an acid number of 60, and a 60% solution of tertiary-amyl hydroperoxide (in tertiary-amyl alcohol) in an amount corresponding to 1% by weight of the aforementioned components. The sample was heated for 20 hours at 125° C. A hard, tough product that was firmly bonded to the metal resulted. There were no visible discoloration or other evidence that the copper had been attacked. The physical characteristics of the copolymer matched those of the product obtained when the same varnish was polymerized under the same conditions in the absence of the bundle of copper wire.

*Example 6*

A coil wound from bare copper wire 80 mils in diameter and having a total area of about 80 square centimeters was completely immersed as described under Example 1 in 10 grams of a varnish which was the same as the varnish of Example 1 except that it contained 1% of 1-hydroxycyclohexyl hydroperoxide-1 instead of 0.5% of benzoyl peroxide. The polymeric material showed no greening or other evidence that the copper had been attacked. The polymerized varnish had a hard shell but "short" interior.

*Example 7*

A bundle of copper wire having a total area of about 40 square centimeters was completely immersed as described in Example 1 in 10 grams of diallyl phthalate into which had been dissolved 1% by weight thereof of 1,1′-di-(hydroxycyclohexyl) peroxide-1,1′. The sample was heated for 48 hours at 100° C. There was no evidence of corrosion or inhibition, and the resulting polymer was a hard, tough solid.

*Example 8*

A varnish prepared from 20 grams of diallyl phthalate, 20 grams of diethylene glycol maleate having an acid value of 50 and one gram of a 38% solution of secondary-butyl hydroperoxide (in secondary-butyl alcohol) was placed in a test tube containing a bundle of 80-mil diameter, bare copper wire having a total area of about 40 square centimeters. The bundle of wire was completely covered with the varnish. The sample was heated for 24 hours at 100° C. There was no evidence of copper discoloration, and the copolymer that formed was hard, tough and well bonded to the copper surface.

*Example 9*

A varnish prepared from 5 grams of diallyl phthalate, 5 grams of diethylene glycol maleate having an acid value of 50 and 0.1 gram of di-(tertiary-butyl perphthalate) was placed in a test tube containing a bundle of copper wire such as described in Example 8. The bundle of wire was completely covered with the varnish. The sample was heated at 85° C. for 20 hours. There was no trace of copper discoloration, and a hard, tough copolymer was formed.

*Example 10*

Same as Example 9 with the exception that the varnish contained 0.1 gram of di-(methyl maleoyl) peroxide instead of 0.1 gram of di-(tertiary-butyl perphthalate) and the heating period was 15 hours at 60° C. followed by heating for 24 hours at 85° C. There was no trace of copper discoloration or of inhibition of polymerization in the areas adjacent to the bare copper.

*Example 11*

This example shows the results obtained when the following peroxides were added to diallyl phthalate and the mixture then allowed to stand in contact with copper for varying periods of time:

Tertiary-butyl hydroperoxide (60% solution in tertiary-butyl alcohol)
Tertiary-amyl hydroperoxide (60% solution in tertiary-amyl alcohol)
1-hydroxycyclohexyl hydroperoxide-1
1,1'-di-(hydroxycyclohexyl) peroxide-1,1'
Di-(tertiary-butyl perphthalate)
Di-(methyl maleoyl) peroxide One-tenth gram of each of the above peroxides was mixed with 10 grams of diallyl phthalate, and the resulting mixture poured into a clean Pyrex test tube. A single strand of bare copper wire, 80 mils in diameter and weighing about 2 grams, was completely immersed in each of the solutions. The stoppered tubes were allowed to stand undisturbed at room temperature. The results were as follows:

| Peroxide Used | Observation |
|---|---|
| Di-(tertiary-butyl perphthalate) | No greening in 1 week, after which time no further observations were made. |
| 1,1'-di-(hydroxycyclohexyl) peroxide-1,1'. | No greening in 1 month, after which time no further observations were made. |
| 1-hydroxycyclohexyl hydroperoxide-1. | No discoloration of any kind after 6 months' standing. |
| Tertiary-amyl hydroperoxide | No discoloration of any kind after 6 months' standing. |
| Tertiary-butyl hydroperoxide | No discoloration after 20 months' standing, and no inhibiting action on the polymerization characteristics of the sample at elevated temperatures. |

When diallyl phthalate containing benzoyl peroxide, dibenzal diperoxide, acetyl peroxide, caprylyl peroxide, pelargonyl peroxide, lauroyl peroxide, stearoyl peroxide and tertiary-butyl perbenzoate was similarly tested, greening was noted around the copper or throughout the entire mass in from 2 to 15 hours, showing that the copper had been attacked. This is further evidence of the specific nature of the peroxides used in practicing the present invention.

*Example 12*

One-tenth gram of benzoyl peroxide was added to 10 grams of butyl methacrylate. The resulting composition was heated at 60° C. in a test tube containing one strand of bare copper wire 80 mils in diameter and having an area of about 8 square centimeters. The wire was completely immersed in the liquid butyl methacrylate. The sample was still fluid after heating for 15 hours, and its intense blue-green color indicated that extensive corrosion of the copper had taken place. This example shows that the unsuitability of benzoyl peroxide as a catalyst for accelerating the polymerization of polymerizable compounds in the presence of copper is not limited to the specific polymerizable compounds hereinbefore mentioned, but is equally true of esters of unsaturated monocarboxylic acids and other monomers.

*Example 13*

A bundle of 80-mil (diameter) copper wire, having a total area of about 40 square centimeters, was immersed completely in 10 grams butyl methacrylate having dissolved therein 1% by weight of 1,1'-di-(hydroxycyclohexyl) peroxide-1,1' (70% active strength). The sample was heated for 40 hours at 80° C. There was no discoloration or other evidence of copper poisoning. The clear, water-white polymer that formed was hard and brittle at room temperature and adhered tightly to the copper wire.

*Example 14*

A bundle of copper wire such as described in Example 13 was covered with styrene into which had been dissolved 1% by weight of a 60% solution of tertiary-butyl hydroperoxide in tertiary-butyl alcohol. The sample was heated for 15 hours at 80° C. and thereafter for 5 hours at 100° C. There was no discoloration or other evidence of copper corrosion. As in the preceding example, the resulting clear, water-white polymer was hard and brittle at room temperature, and adhered well to the copper.

*Example 15*

A coil of bare copper wire 80 mils in diameter and having a surface area of 16 square centimeters was completely immersed in a varnish comprising 5 grams diallyl phthalate, 5 grams diethylene glycol maleate (acid value 50) and 0.1 gram di-(tertiary-butyl persuccinate). The sample was heated at 85° C. for 24 hours. There was no trace of copper discoloration and a hard, tough copolymer was formed.

*Example 16*

Same as in Example 15 with the exception that the varnish contained 0.1 gram di-(tertiary-butyl peradipate) instead of di-(tertiary-butyl persuccinate). As in the preceding example, the resulting copolymer was hard and tough, and showed no trace of copper discloration.

*Example 17*

Same as in Example 15 with the exception that the varnish contained 0.1 gram tertiary-butyl perfuroate in place of di-(tertiary-butyl persuccinate). The resulting copolymer had the same characteristics as the products of Examples 15 and 16.

*Example 18*

A coil of Phosphor-bronze wire 20 mils in diameter and having a surface area of 30 square centimeters was completely immersed in a polymerizable composition comprising, by weight, 5 parts diallyl phthalate, 5 parts diethylene glycol maleate (acid value 60) and 0.1 part di-(tertiary-butyl perphthalate) contained in a glass tube. Heating at 85° to 95° C. for 40 hours produced a hard, tough copolymer with no trace of copper discoloration or inhibition.

*Example 19*

Same as in Example 18 except that a coil of brass wire 39 mils in diameter and having a surface area of 29 square centimeters was used and 0.1 part tertiary-butyl perfuroate was employed instead of 0.1 part di-(tertiary-butyl perphthalate). As in the preceding example, the resulting copolymer was hard and tough, and showed no trace of copper discloration or inhibition.

It will be noted that in all of the foregoing examples the metal (copper or alloy thereof) was completely immersed in the polymerizable composition.

As evidence of the fact that the action of the peroxide is independent of the medium employed, the following examples are given:

*Example 20*

Copper pellets weighing 5 grams were placed in a test tube containing a 10% solution of benzoyl peroxide in toluene. The sample was heated for 20 hours at 80° C. during which time an intensely blue-green color developed and a blue deposit formed. The latter was filtered off, washed, dried and analyzed. The copper content agreed with that calculated for cupric benzoate.

*Example 21*

Copper pellets weighing 5 grams were placed in a test tube containing toluene in which was dissolved 10% by weight of a 60% solution of tertiary-butyl hydroperoxide in tertiary-butyl alcohol. The sample was heated for 20 hours at 100° C. The liquid was not discolored and there were no visible signs that the copper pellets had been attacked at the end of this period of time.

It will be understood, of course, by those skilled in the art that the foregoing examples are given merely by way of illustration and not by way of limitation. Thus, instead of copper specifically mentioned in most of the examples, similar results are obtained when the polymerization is effected in the presence of an alloy of copper, e. g., brass, bronze, etc., as evidenced by the results of Examples 18 and 19. Likewise it will be understood that the invention is applicable to the polymerization of polymerizable compounds in the presence of copper or a copper alloy regardless of the form of the latter. For example, the copper or copper alloy may be in wire form or it may be in sheet, rod, tube, bar, electroplated (in the case of copper) or other form.

Other and more specific examples of polymerizable compositions that may be used in practicing our invention are esters containing ethylenic or acetylenic unsaturation in either the alcohol radical or the acid radical, or in both, e. g., saturated and unsaturated alcohol esters of unsaturated monocarboxylic and polycarboxylic acid, unsaturated alcohol esters of non-ethylenic (e. g., aromatic and saturated aliphatic) polycarboxylic acids, unsaturated alcohol esters of saturated monocarboxylic acids, etc. Thus, the polymerizable compositions may be, for instance, unsaturated alcohol esters, e. g., the vinyl, allyl, methallyl, crotyl, propargyl, 1-chloroallyl, 2-chloroallyl, cinnamyl, etc., esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, aconitic, benzoic, toluic, phthalic, chlorinated or other halogenated phthalic, terephthalic, isophthalic, benzoyl phthalic, cinnamic, etc.; the saturated alcohol esters, e. g., the methyl, ethyl, propyl, butyl, isobutyl, ethylene glycol, glycerol, pentaerythritol, etc., esters of the unsaturated aliphatic monobasic and polybasic acids, illustrative examples of which acids appear above; vinyl cyclic compounds, e. g., vinyl naphthalene, vinyl furane, divinyl benzene, etc.; unsaturated ethers, e. g., diallyl ether, etc.; unsaturated ketones, e. g., divinyl ketone, methyl vinyl ketone, etc.; methylene malonic esters, e. g., methylene dimethyl malonate, methylene diethyl malonate, etc.; polymerizable unsaturated alkyd resins, both modified and unmodified, e. g., ethylene glycol maleate, diethylene glycol fumarate, propylene glycol itaconate, glyceryl maleate, diethylene glycol fumarate phthalate, ethylene glycol maleate succinate, acetic acid-modified ethylene glycol maleate, octyl alcohol-modified diethylene glycol fumarate, numerous other examples appearing, for example, in Nordlander copending applications Serial Nos. 302,165 and 302,166, filed October 31, 1939, both now abandoned, in D'Alelio copending applications Serial Nos. 302,167, 302,168 and 302,174, also filed October 31, 1939, and now Patents Nos. 2,407,479, 2,428,787 and 2,428,788 respectively, and in D'Alelio Patents 2,260,005, 2,288,315, 2,308,494, 2,308,495, 2,309,798 and 2,323,706; allyl esters, e. g., allyl acrylate, allyl methacrylate, diallyl maleate, diallyl itaconate, diallyl fumarate, triallyl aconitate, triallyl tricarballylate, triallyl phosphate, etc., numerous other examples of these and other polymerizable compounds being given in the aforementioned Nordlander and D'Alelio applications and patents; and homogeneous mixtures of the compounds (as broadly and specifically mentioned) hereinbefore set forth and others given in the above-identified applications and patents.

We prefer to use polymerizable compounds or compositions containing one or more (more particularly two, three, four or more) $CH_2=C<$ groupings, numerous examples of which materials have been given herein. Where the combination of polymerized material and copper or alloy thereof may be subjected to an elevated temperature (e. g., 80° C. or above) during service use, it also generally is preferable to use a polymerizable composition that can be polymerized to a substantially infusible state. Polymerizable materials that can be polymerized to a state wherein they are not only infusible but also substantially insoluble in the ordinary solvents and chemicals are particularly useful in many applications.

The amount of peroxide which is incorporated in the polymerizable composition may be varied considerably, but generally will be within the range of 0.2% to 4 or 5% by weight by the polymerizable material with which it is incorporated. Good results have been obtained when the peroxide is employed in an amount corresponding to from 0.5 to 1.5% by weight of the polymerizable composition.

Polymerization of the polymerizable composition may be effected at temperatures ranging, for example, from room temperature (20° to 30° C.) to temperatures above 100° C., for example about 130° C., but ordinarily we use temperatures within the range of 60° to 120° C. in causing the polymerizable compound or homogeneous mixture of compounds to polymerize.

The present invention is particularly useful in the production of electrical coils where it obviates the difficulties heretofore encountered in effecting satisfactory polymerization of polymerizable coil impregnants in contact with copper conductors exposed to the action of the varnish, e. g., copper wires having permeable insulation such as paper, cotton cloth, etc., adjacent the wires. However, the invention also may be used in making switch-board panels, housings for various electrical devices, etc., in insulating coils and other parts of transformers, in fabricating decorative, household and industrial articles wherein a polymerizable compound is cast around an insert of copper or an alloy thereof, and in numerous other applications.

What we claim as new and desire to secure by Letters Patent of the United States is:

1. An article of manufacture comprising a metal selected from the class consisting of copper and alloys of copper surrounded at least in part by and in direct contact with a solid polymer free of discoloration and free of evidence of retardation of polymerization, said polymer comprising the product of polymerization of a mixture of ingredients comprising (*a*) a polymerizable organic ester containing a polymerizable grouping selected from the class consisting of the $CH_2=C<$ grouping and the —CH=CH— grouping of an alpha unsaturated alpha beta polycarboxylic acid, and (*b*) an accelerator of polymerization comprising a compound selected from the class consisting of secondary-butyl hydroperoxide, tertiary-butyl hydroperoxide, tertiary-amyl hydroperoxide, 1-hydroxycyclohexyl hydroperoxide-1, 1,1′-di(hydroxycyclohexyl) peroxide-1,1′, di-(tertiary-butyl perphthalate), di-(tertiary-butyl persuccinate), di-(tertiary-butyl peradipate), tertiary-butyl perfuroate, di-(methyl maleoyl) peroxide and low-molecular-weight polymers of di-(methyl maleoyl) peroxide, the aforementioned accelerators of polymerization being capable of polymerizing the polymerizable composition without retardation of polymerization and without discoloration of the polymerizable material as a result of the direct contact of the latter with the metal of the aforementioned class.

2. An article of manufacture comprising a metal selected from the class consisting of copper and alloys of copper having a solid porous covering upon said metal, the metal and porous coating being surrounded at least in part by and in direct contact with a solid polymer free of discoloration and free of evidence of retardation of polymerization, said polymer comprising the product of polymerization of a mixture of ingredients comprising (*a*) a polymerizable organic ester containing a polymerizable grouping selected from the class consisting of the $CH_2=C<$ grouping and the —CH=CH— grouping of an alpha unsaturated alpha beta polycarboxylic acid, and (*b*) an accelerator of polymerization comprising a compound selected from the class consisting of secondary-butyl hydroperoxide, tertiary-butyl hydroperoxide, tertiary-amyl hydroperoxide, 1-hydroxycyclohexyl hydroperoxide-1, 1,1′-di-(hydroxycyclohexyl) peroxide-1,1′, di-(tertiary-butyl perphthalate), di-(tertiary-butyl peradipate), tertiary-butylperfuroate, di-(methyl maleoyl) peroxide and low-molecular-weight polymers of di-(methyl maleoyl) peroxide, the aforementioned accelerators of polymerization being capable of polymerizing the polymerizable composition without retardation of polymerization and without discoloration of the polymerizable material as a result of direct contact of the latter with the metal of the aforementioned class.

3. An article of manufacture comprising copper surrounded at least in part by and in direct contact with a solid polymer free of discoloration and free of evidence of retardation and polymerization, said polymer comprising the product of polymerization of a mixture of ingredients comprising (*a*) a heat-polymerizable unsaturated alkyd resin and (*b*) a small amount of tertiary-butyl hydroperoxide as an accelerator of polymerization, the said accelerator being capable of polymerizing the polymerizable composition without retardation of polymerization and without discoloration of the polymerizable material as a result of the direct contact of the latter with the copper.

4. An article of manufacture comprising copper surrounded at least in part by and in direct contact with a solid polymer free of discoloration and free of evidence of retardation of polymerization, said polymer comprising the product of polymerization of a mixture of ingredients comprising (*a*) a heat-polymerizable unsaturated alkyd resin and (*b*) a small amount of tertiary-butyl perfuroate as an accelerator of polymerization, the aforementioned accelerator being capable of polymerizing the polymerizable composition without retardation of polymerization and without discoloration of the polymerizable material as the result of the direct contact of the latter with the copper.

5. An article of manufacture comprising copper surrounded at least in part by and in direct contact with a solid polymer free of discoloration and free of evidence of retardation of polymerization, said polymer comprising the product of polymerization of a mixture of ingredients comprising (*a*) a heat-polymerizable unsaturated alkyd resin and (*b*) a small amount of di-(tertiary-butyl perphthalate) as an accelerator of polymerization, the aforementioned accelerator being capable of polymerizing the polymerizable composition without retardation of polymerization and without discoloration of the polymerizable material as a result of the direct contact of the latter with the copper.

6. The method which comprises polymerizing in contact with a metal selected from the class consisting of copper and alloys of copper, a polymerizable organic ester contacting and surrounding at least in part the aforesaid metal and containing a polymerizable grouping selected from the class consisting of the $CH_2=C<$ grouping and the —CH=CH— grouping of an alpha unsaturated alpha beta polycarboxylic acid and having incorporated therein as an accelerator of polymerization a compound selected from the class consisting of secondary-butyl hydroperoxide, tertiary-butyl hydroperoxide, tertiary-amyl hydroperoxide, 1-hydroxycyclohexyl hydroperoxide-1, 1,1′-di-(hydroxycyclohexyl) peroxide-1,1′, di-(tertiary-butyl perphthalate), di-(tertiary-butyl persuccinate), di-(tertiary-butyl peradipate), tertiary-butyl perfuroate, di-(methyl maleoyl) peroxide and low-molecular-weight polymers of di-(methyl maleoyl) peroxide, the aforementioned accelerators being capable of polymerizing the polymerizable composition without retardation of polymerization and without discoloration of the polymerizable material as a result of the contact of the latter with the metal of the aforementioned class.

7. An article of manufacture comprising copper surrounded at least in part by and in direct contact with a solid polymer free of discoloration and free of evidence of retardation of polymerization, said polymer comprising the product of polymerization of a mixture of ingredients comprising (*a*) a heat-polymerizable composition comprising diethylene glycol maleate and diallyl phthalate and (*b*) a small amount of tertiary-butyl hydroperoxide as an accelerator of polymerization, said accelerator being capable of polymerizing the polymerizable composition without retardation of polymerization and without discoloration of the polymerizable material as a result of the direct contact of the latter with the copper.

8. The method which comprises polymerizing, in contact with copper and at a temperature within the range of 60° to 130° C., a heat-polymerizable composition comprising a polymerizable unsaturated alkyd resin having incorporated therein as an accelerator of polymerization a compound of the class defined in claim 6, said accelerator being capable of polymerizing the polymerizable composition without retardation of polymerization and without discoloration of the polymerizable material as a result of the contact of the latter with the copper.

BIRGER W. NORDLANDER.
JOHN A. LORITSCH.

REFERENCES CITED

The following references are of record in the file of this patent:

UNITED STATES PATENTS

| Number | Name | Date |
|---|---|---|
| 961,805 | Scott | June 21, 1910 |
| 1,213,726 | Baekeland | Jan. 23, 1917 |
| 2,147,824 | Webb | Feb. 21, 1939 |
| 2,172,445 | Lutz | Sept. 12, 1939 |
| 2,191,581 | Novak et al. | Feb. 27, 1940 |
| 2,340,109 | D'Alelio | Jan. 25, 1944 |
| 2,367,805 | Semple | Jan. 23, 1945 |
| 2,379,978 | Meyer | July 10, 1945 |
| 2,391,920 | Peterson | Jan. 1, 1946 |
| 2,443,736 | Kropa | June 22, 1948 |